(12) United States Patent
Lin et al.

(10) Patent No.: US 10,642,569 B2
(45) Date of Patent: May 5, 2020

(54) METHODS AND DEVICES FOR IDENTIFYING OBJECT IN VIRTUAL REALITY COMMUNICATION, AND VIRTUAL REALITY EQUIPMENT

(71) Applicant: Beijing Xiaomi Mobile Software Co., Ltd., Haidian Street, Beijing (CN)

(72) Inventors: Xingsheng Lin, Beijing (CN); Zhiyong Feng, Beijing (CN); Kun Ma, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 94 days.

(21) Appl. No.: 15/634,752

(22) Filed: Jun. 27, 2017

(65) Prior Publication Data

US 2018/0032304 A1    Feb. 1, 2018

(30) Foreign Application Priority Data

Jul. 26, 2016   (CN) .......................... 2016 1 0597781

(51) Int. Cl.
*G06F 3/16*     (2006.01)
*G06F 3/0481*   (2013.01)
(Continued)

(52) U.S. Cl.
CPC .............. *G06F 3/16* (2013.01); *G06F 3/013* (2013.01); *G06F 3/017* (2013.01);
(Continued)

(58) Field of Classification Search
None
See application file for complete search history.

(56) References Cited

U.S. PATENT DOCUMENTS 6,396,509 B1    5/2002  Cheng
8,441,356 B1 *  5/2013  Tedesco ............. G08B 21/0453
                                              340/539.15
(Continued)

FOREIGN PATENT DOCUMENTS

CN    102170361 A    8/2011
CN    102263772 A    11/2011
(Continued)

OTHER PUBLICATIONS

European Patent Office, Extended European Search Report, Application No. 17156238.2, dated Sep. 8, 2017.
(Continued)

*Primary Examiner* — Christopher R Lamb
(74) *Attorney, Agent, or Firm* — Arch & Lake LLP (57) ABSTRACT

A method, a VR equipment, and a device are provided for identifying an object in Virtual Reality (VR) communication. The method includes: action direction information of an action performed by a user is acquired, which represents an indicated direction; a target scene object corresponding to the indicated direction is determined according to the action direction information and scene position information which represents positions of respective scene objects in a VR scene where the user is located; and a speech of the user is identified as a speech of the user to the target scene object.

14 Claims, 4 Drawing Sheets

(51) Int. Cl.
*G06F 3/01* (2006.01)
*G06F 3/0484* (2013.01)
*G06K 9/00* (2006.01)
*G10L 15/22* (2006.01)
*G10L 15/24* (2013.01)

(52) U.S. Cl.
CPC ...... *G06F 3/04815* (2013.01); *G06F 3/04842* (2013.01); *G06K 9/00355* (2013.01); *G06K 9/00604* (2013.01); *G10L 15/22* (2013.01); *G10L 15/24* (2013.01)

(56) References Cited

U.S. PATENT DOCUMENTS

| | | | |
|---|---|---|---|
| 9,361,512 B2 | 6/2016 | Cronholm | |
| 9,451,210 B1* | 9/2016 | Smus | H04N 7/15 |
| 9,538,133 B2 | 1/2017 | Diao | |
| 2008/0263460 A1 | 10/2008 | Altberg | |
| 2010/0315482 A1* | 12/2010 | Rosenfeld | H04N 7/147 |
| | | | 348/14.08 |
| 2012/0249416 A1 | 10/2012 | Maciocci | |
| 2013/0076853 A1 | 3/2013 | Diao | |
| 2014/0225918 A1 | 8/2014 | Mittal | |
| 2014/0237366 A1 | 8/2014 | Poulos et al. | |
| 2015/0055808 A1* | 2/2015 | Vennstrom | G06F 3/167 |
| | | | 381/307 |
| 2015/0220776 A1 | 8/2015 | Cronholm | |
| 2015/0261318 A1 | 9/2015 | Scavezze et al. | |
| 2015/0268821 A1* | 9/2015 | Ramsby | G06F 3/013 |
| | | | 715/765 |
| 2016/0034039 A1 | 2/2016 | Maeda | |
| 2016/0085305 A1 | 3/2016 | Spio | |
| 2016/0162020 A1 | 6/2016 | Lehman | |
| 2016/0180591 A1 | 6/2016 | Shiu | |
| 2016/0195935 A1 | 7/2016 | Cronholm | |
| 2017/0150230 A1 | 5/2017 | Shimura | |

FOREIGN PATENT DOCUMENTS

| | | |
|---|---|---|
| CN | 103942697 A | 7/2014 |
| CN | 104025572 A | 9/2014 |
| CN | 104583902 A | 4/2015 |
| CN | 104991650 A | 10/2015 |
| CN | 105009031 A | 10/2015 |
| CN | 105027033 A | 11/2015 |
| CN | 105190477 A | 12/2015 |
| CN | 105446481 A | 3/2016 |
| CN | 105718046 A | 6/2016 |
| CN | 106155326 A | 11/2016 |
| JP | 07030877 A | 1/1995 |
| JP | H08226348 A | 9/1996 |
| JP | 2003062327 A | 3/2003 |
| JP | 2003304350 A | 10/2003 |
| JP | 2009514090 A | 4/2009 |
| JP | 2009122776 A | 6/2009 |
| JP | 2010191544 A | 9/2010 |
| JP | 2011513847 A | 4/2011 |
| JP | 2013041553 A | 2/2013 |
| JP | 2014186361 A | 10/2014 |
| JP | 2015179391 A | 10/2015 |
| JP | 2016514298 A | 5/2016 |
| RU | 2109336 C1 | 4/1998 |
| WO | 2012150657 A1 | 11/2012 |
| WO | 2016002445 A1 | 1/2016 |

OTHER PUBLICATIONS

International Search Report and Written Opinion of the International Search Authority in international application No. PCT/CN2016/107519, dated Mar. 30, 2017, 9 pages.

Russian First Office Action (including English translation) issued in corresponding RU Application No. 2017122954, dated Jun. 28, 2018, 14 pages.

Chinese First Office Action (including English translation) issued in corresponding CN Patent Application No. 201610597781.6, dated Jul. 3, 2018, 19 pages.

Japanese Office Action issued in corresponding JP Patent Application No. 2017-529399, dated Aug. 27, 2018, 4 pages.

Japanese Office Action issued in JP Application No. 2017-529399, dated Apr. 9, 2019, 6 pages.

* cited by examiner

METHODS AND DEVICES FOR IDENTIFYING OBJECT IN VIRTUAL REALITY COMMUNICATION, AND VIRTUAL REALITY EQUIPMENT

CROSS-REFERENCE TO RELATED APPLICATION

This application is based upon and claims priority from Chinese Patent Application No. 201610597781.6, filed on Jul. 26, 2016, the entire contents of which are incorporated herein by reference.

TECHNICAL FIELD

The embodiments of the present disclosure generally relate to a Virtual Reality (VR) technology, and more particularly, to methods and devices for identifying an object in VR communication, and VR equipment.

BACKGROUND

With rapid development of networks and sciences and technologies, VR has gradually become a popular high technology in recent years, and more and more users can enjoy new experiences brought by the VR technology. With increase of the number of users experiencing VR, there is involved a problem, i.e. VR social communication. How to implement information interaction among multiple users in the same VR scene is a problem needs to be solved.

SUMMARY

According to a first aspect of embodiments of the present disclosure, there is provided a method for identifying an object in Virtual Reality (VR) communication. In the method, a VR device acquires action direction information of an action performed by a user, which represents an indicated direction. The VR device determines a target scene object corresponding to the indicated direction according to the action direction information and scene position information which represents positions of respective scene objects in a VR scene where the user is located. The VR device then identifies a speech of the user as a speech of the user to the target scene object.

According to a second aspect of the present disclosure, there is provided a device for identifying an object in Virtual Reality (VR) communication. The device may include: a processor; and a memory configured to store instructions executable by the processor. The processor is configured to: acquire action direction information of an action performed by a user, which represents an indicated direction; determine a target scene object corresponding to the indicated direction according to the action direction information and scene position information which represents positions of respective scene objects in a VR scene where the user is located; and identify a speech of the user as a speech of the user to the target scene object.

According to a third aspect of the present disclosure, there is provided a non-transitory computer-readable storage medium having stored therein instructions that, when executed by a processor of device for identifying an object in Virtual Reality (VR) communication, causes the device to perform a method for identifying an object in Virtual Reality (VR) communication. The method may include: acquiring action direction information of an action performed by a user, which represents an indicated direction; determining a target scene object corresponding to the indicated direction according to the action direction information and scene position information which represents positions of respective scene objects in a VR scene where the user is located; and identifying a speech of the user as a speech of the user to the target scene object.

It is to be understood that the above general descriptions and detailed descriptions below are only exemplary and explanatory and not intended to limit the present disclosure.

BRIEF DESCRIPTION OF THE DRAWINGS

The accompanying drawings, which are incorporated in and constitute a part of this specification, illustrate embodiments consistent with the present disclosure and, together with the specification, serve to explain the principles of the present disclosure.

DETAILED DESCRIPTION

Description will now be made in detail on exemplary embodiments, examples of which are illustrated in the accompanying drawings. The following description refers to the accompanying drawings in which the same numbers in different drawings represent the same or similar elements unless otherwise indicated. The implementations set forth in the following description of exemplary embodiments do not represent all implementations consistent with the present disclosure. Instead, they are merely examples of devices and methods consistent with some aspects related to the present disclosure as recited in the appended claims.

In a VR communication scene, there are usually multiple users participating in the same VR scene, and users may be required to communicate with one another. For example, in an exemplary scene, multiple users have a meeting for work discussion in a VR scene by using a VR technology. In another exemplary scene, users perform instant messaging by using VR equipment. Friends in an instant messaging application may be located in the same VR scene, and information communication among the friends may also be implemented in the VR scene. In all of these exemplary scenes, the condition that a user speaks to another specific user may occur.

Figure 1:
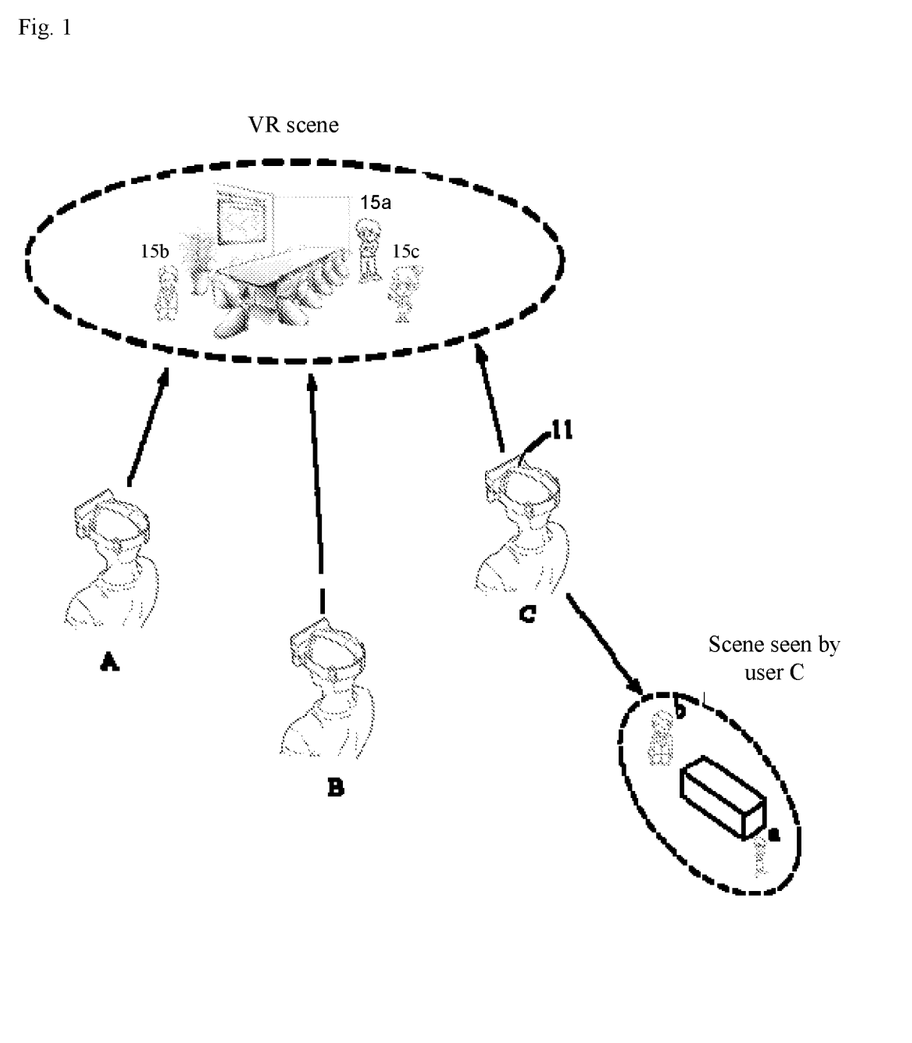
FIG. 1 is a schematic view showing an application scene of VR communication, according to an exemplary embodiment.

FIG. 1 shows an application scene of VR communication, according to an exemplary embodiment. As shown in FIG. 1, user A, user B and user C are located in the same VR scene. The scene may be, for example, a meeting room. The three users are having a meeting. Moreover, each of the users in the VR scene may be a role, set in the scene, corresponding to the user. The roles in the scene may be called scene objects. For example, scene object 15*a* corresponds to user A, scene object 15*b* corresponds to user B and scene object 15*c* corresponds to user C.

Each user may wear VR equipment 11 such as a VR helmet. The VR scene where all the users are located may be seen through the VR equipment 11. For example, a VR server may generate the VR scene and send scene information of the scene to the VR equipment 11 of each user to enable the VR equipment 11 to display the VR scene at the users according to the scene information.

For example, the scene information may include: object IDs of respective scene objects and scene position information of respective scene objects. The object IDs may be account IDs of the users. The account IDs may be instant messaging accounts, or accounts allocated to each user by the server during the current VR communication. The scene position information represents positions of the scene objects in the scene. For example, in the VR scene shown in FIG. 1, scene object 15*a* is set on a side by the window in a corner of a meeting table, scene object 15*b* is set on a diagonal side of scene object 15*a* and close to a flowerpot in the meeting room, and scene object 15*c* is set close to scene object 15*a* and located at a left front part at a distance of 2 meters from a front of scene object 15*a*. Such role position settings are the scene position information.

It is to be noted that the VR scenes seen by the respective users from the perspective of the user are different from each other, although user A, user B and user C are located in the same VR scene. The difference is that the VR scene seen by each of the users through the VR equipment 11 is a VR scene seen from the perspective of the scene object corresponding to the user in the VR scene. For example, as shown in FIG. 1, user C is taken as an example, the VR scene seen by user C only includes scene object 15*a* and scene object 15*b*, and of course cannot see scene object 15*c* corresponding to user C. Moreover, scene object 15*a* is located at a right rear position 2 meters away from user C (from the perspective of user A, scene object 15*c* is located at a left front position 2 meters away from user A), and scene object 15*b* is located at a right front position of user C and close to the flowerpot in the meeting room.

In addition, the VR scene seen by each user may be generated by the VR equipment 11 worn by the user. Accordingly, the VR equipment 11 may store the scene information of the VR scene, including the object IDs of the respective scene objects in the scene or the scene position information of the scene objects. In an example of the embodiment of the present disclosure, during VR communication, the VR equipment may identify a communication object according to the scene information, as described in detail below.

For example, still in the scene shown in FIG. 1, user A, user B and user C in FIG. 1 may be located in a group chat scene, that is, speeches of respective the users may be heard by all the users in a chat group. In such case, the users may also select a specific user in the chat group to speak to by simply issuing a prompt that the speeches are made to a specific user in the scene, but speeches may still be heard by the other users. Alternatively, the three users in FIG. 1 may be located in a private chat scene. That is, although a plurality of communication friends are displayed in the VR scene, the users may select a specific friend of the communication friends to speak to. This is different from the group chat scene in that speeches made in such manner may only be heard by the specific friend, and cannot be heard by the other friends.

Figure 2:
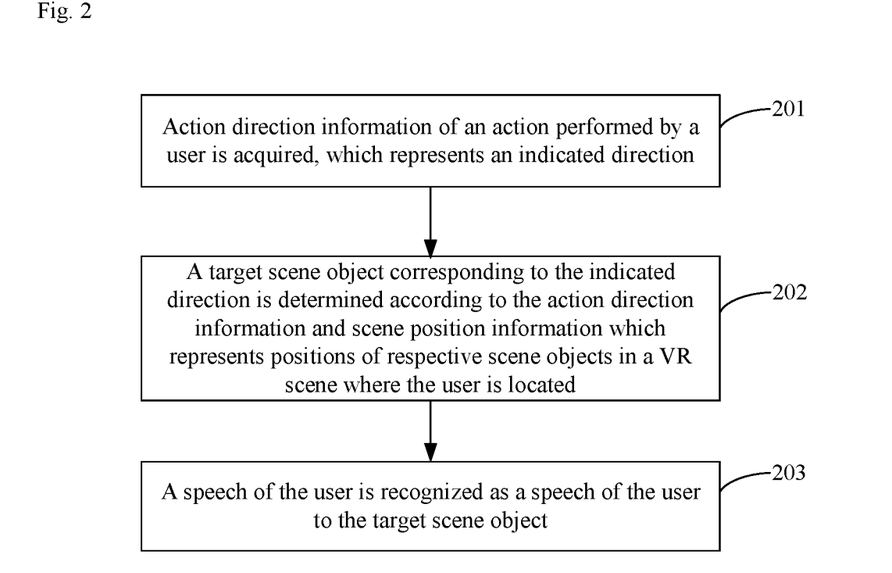
FIG. 2 is a flow chart showing a method for identifying an object in VR communication, according to an exemplary embodiment.

Either the group chat scene or the private chat scene involves recognition or identification of the communication object. That is, the VR device may need to determine which target object in the VR scene a user intends to communicate with. Here, the target object in the VR device may be referred as the target scene object. FIG. 2 is a flow chart showing a method for identifying the target object in VR communication, according to one or more exemplary embodiments. The method may be performed by a VR equipment worn by a user. The method may be used to identify for which scene object the user is talking to or pointing to. The method may include the following steps.

In Step 201, action direction information of an action performed by a user is acquired. The action direction information may represent an indicated direction. The indicated direction may include a pointing direction when the action is performed by the user.

Here, the action direction information of the action performed by the user may include the indicated direction presented by using an action of his/her own body. For example, the indicated direction may include the pointing direction of the user's finger, the user's nose tip, the user's hand, the user's foot, the user's eyeball, or other body part of the user. The user may rotate eyeballs to represent different line-of-sight directions, indicate a direction by a hand motion, or the like.

For example, when detecting that the user currently speaks, the VR equipment may acquire the action direction information of the action performed by the user during a speech. Of course, the present disclosure is not limited to the situation where a processing flow of the present example is performed during the speech. Alternatively or additionally, the processing flow, such as direction recognition and object recognition, may be performed before the user speaks. Following descriptions describes an example situation where the processing flow is performed during the speech. And the descriptions are also applicable to other scenes. For example, the user may speak by using a microphone of the VR equipment, and then the VR equipment may know that the user currently speaks. In the step, the VR equipment may detect the action direction information of the action performed by the user in a speaking process of the user.

Figure 3:
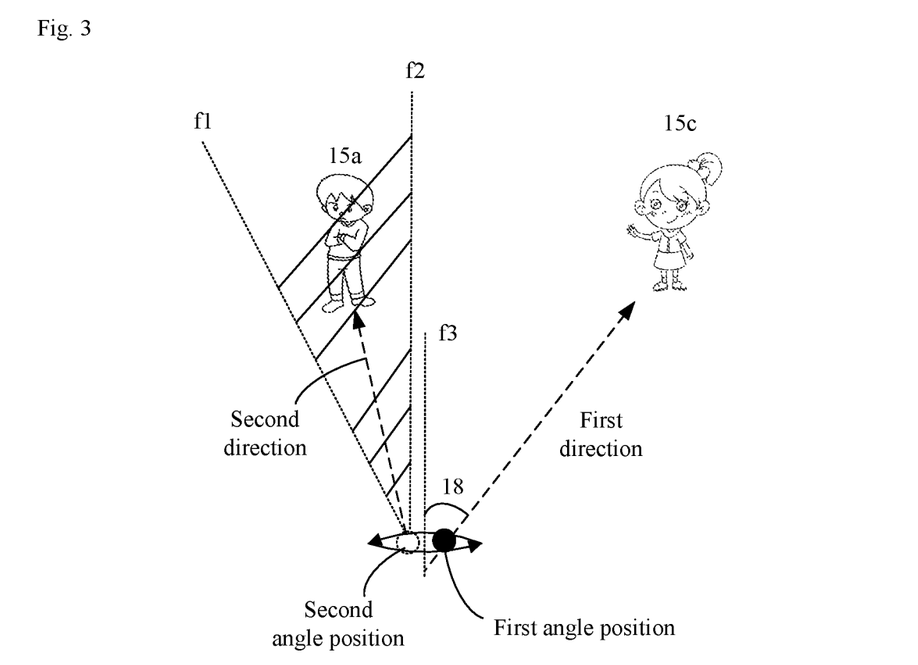
FIG. 3 is a schematic view showing an implementation of detecting action direction information, according to an exemplary embodiment.

FIG. 3 is a schematic view showing detection of action direction information, according to an exemplary embodiment. As shown in FIG. 3, the VR equipment may obtain a direction of a line of sight of the user according to an angle of an eyeball 18 of the user by using an eyeball tracking technology. The angle of the eyeball 18 is the angle between f3 and the first direction. The VR equipment or VR device may track eyeball of the user by using one or more camera sensors to following the eyeball movement. The VR device may use pattern recognition or other algorithm to identify the eyeball and then track the movement of the eyeball by analyzing a plurality of images obtained during a preset time period, where the preset time period may be set between 10 ms and 800 ms. The VR device may use and infrared, near-infrared non-collimated light, or visible light to illuminate and to create corneal reflections. For example, when the eyeball is determined to be located at first angle position, the direction of the line of sight of the user is a first direction, and when the eyeball is determined to be located at second angle position, the direction of the line of sight of the user is a second direction.

For example, in order to prevent misjudgment by the VR equipment, the settings may be made as follows in the VR equipment. When a proportion of a time period for which the angle of the eyeball of the user is fixed during the speech to a total time period of the speech reaches a preset proportion threshold value, for example, when the user keeps staring at a certain scene object during the time period of the speech and the time period proportion reaches 100%, or when the user keeps staring at a certain scene object for a time period which is 80% of the time period of the whole speech, the VR equipment may determine that the user speaks to the scene object. Then, the direction of the line of sight determined according to the angle of the eyeball is the indicated direction of the speech of the user, and the indicated direction of the speech may indicate a direction to which the user speaks. The indicated direction may be used to identify the target that the user intends to communicate or interact with.

Figure 4:
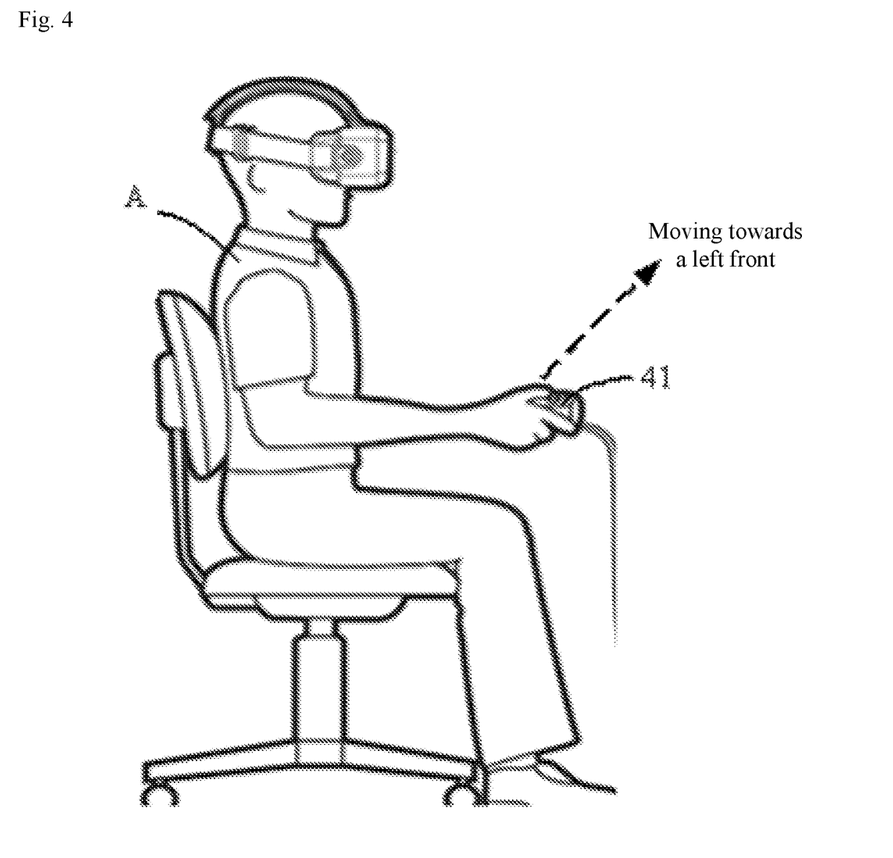
FIG. 4 is a schematic view showing another implementation of detecting action direction information, according to an exemplary embodiment.

FIG. 4 is a schematic view showing another implementation of detecting action direction information, according to an exemplary embodiment. As shown in FIG. 4, the VR equipment may include a hand motion detector 41 which can detect a hand motion of the user. For example, user A in FIG. 4 may see that scene object 15b is located at his/her right front position and scene object 15c is located at his/her left front position in the VR scene. Of course, object IDs of respective scene objects may be displayed in the VR scene to enable the current user to know whom the respective scene objects stand for. If user A intends to speak to scene object 15c (i.e. user C), user A may, for example, as shown in FIG. 4, move to a left front (i.e., scene object 15c) in the scene, by using a hand motion when speaking. As such, the hand motion detector 41 can detect the direction of the hand motion of the user.

For example, in order to prevent misjudgment, the settings may be made as follows: when a motion distance of the hand motion of the user towards a certain direction reaches a certain distance threshold value, the direction of the hand motion is determined as the indicated direction of the speech of the user. When user A intends to speak to user C and moves to the left front by more than 5 cm by using the hand motion, the direction of the hand motion is determined as the indicated direction of the speech of the user. Thus, it is determined that the user speaks to the scene object towards which the hand motion is made.

In Step 202, a target scene object corresponding to the indicated direction is determined according to the action direction information and scene position information which represents positions of respective scene objects in a VR scene where the user is located.

In the step, the VR equipment may determine the target scene object corresponding to the indicated direction according to the scene position information of respective scene objects as well as the action direction information obtained in Step 201.

For example, as shown in FIG. 3, from the perspective of user B, in the VR scene seen by user B, scene object 15a is located at a left front position and scene object 15c is located at a right front position. The VR equipment may obtain the scene information from scene information stored locally or remotely. After the VR equipment worn by user B has obtained the scene information, the positions of respective scene objects in the scene may be determined by the VR equipment. That is, when user B intends to speak to scene object 15a, the VR equipment knows the orientation of scene object 15a relative to user B. For example, the second direction shown in FIG. 3 is a line connected between scene object 15b and scene object 15a.

When the direction indicated by the action direction information obtained by the VR equipment in Step 201 is the second direction, scene object 15a is determined as the target scene object of the speech. However, there is a possibility that the direction indicated by the angle of the eyeball of the user doesn't match the second direction very well. In such case, a range of direction may be set. As shown in FIG. 3, a range from direction f1 to direction f2 may be considered as a range of direction corresponding to scene object 15a, as long as there is only one scene object, i.e. scene object 15a, in this range. Note that the scene object 15a is a speaker at a particular moment. Thus, when there are multiple users between f1 and f2, the VR equipment only recognizes the user who speaks.

In Step 203, a speech of the user is identified as a speech of the user to the target scene object. The VR equipment may then send the speech data to the target scene object so that the target scene object may respond or react according to the message in the speech data.

After the target scene object is determined in Step 202, the speech of the user may be associated with the target scene object and identified as the speech of the user to the target scene object, thereby fulfilling the aim of identifying the scene object in VR communication.

According to the method for identifying an object in the embodiment of the present disclosure, the action direction information during the speech of the user is acquired, and the target scene object corresponding to the action direction information is determined, so that recognition or identification of a communication object is implemented. Moreover, with adoption of the method, the user may select a scene object that the user intends to speak to by moving his/her own eyeballs, the hand motion or the like. Thus, the VR equipment may identify a scene object that the user intends to speak to by tracking the eyeball movement or hand movement. The disclosed method is relatively easy to implement and achieves good user experience.

In addition, after identifying the target scene object for communication, the VR equipment may send information on the speech of the user to the target scene object. The information on the speech may, for example, include an object ID of a speaker and content of the speech. For example, when it is identified that user B speaks to scene object 15a, content of the speech of user B may be sent to the VR equipment of user A corresponding to scene object 15a, and the VR equipment of user A plays the content of the speech.

When user B is in a private chat scene, the content of the speech may be sent to the VR equipment of user A corresponding to scene object 15a only.

When user B is in the group chat scene, the content of the speech may be sent to the VR equipment of all the users in the chat group, and all the users may hear the speech of user B. Further, the VR equipment may play the speech to user B with an emphasis so that user A understands that user B is talking to him or here. This emphasis may be implemented by many different ways. For example, the volume may be louder, the VR equipment of user A may also simulate a sound direction effect by multiple speakers. Moreover, the VR equipment of user A may display a prompt, for example, a prompt that the speech is specifically sent to scene object 15a, may be made in the scene. The speech may be played through a scene object corresponding to the speaker in the VR scene according to the object ID of the speaker during playing of the VR equipment, regardless of which scene is adopted.

Figure 5:
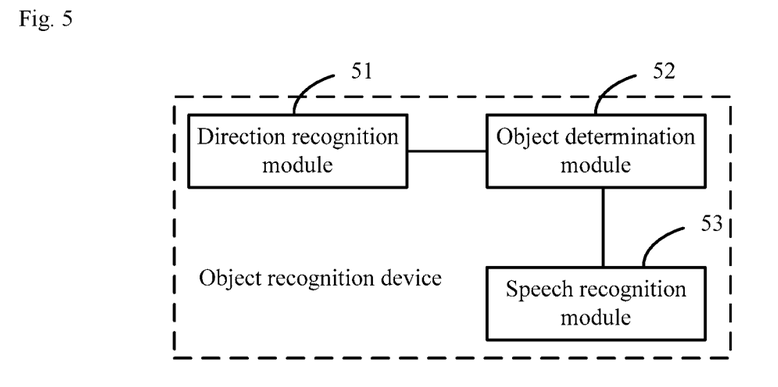
FIG. 5 is a structure diagram showing a device for identifying an object in VR communication, according to an exemplary embodiment.

FIG. 5 is a diagram showing a structure of a device for identifying an object in VR communication, according to an exemplary embodiment. As shown in FIG. 5, the device may include a direction recognition module 51, an object determination module 52 and a speech recognition module 53.

The direction recognition module 51 is configured to acquire action direction information of an action performed by a user, which represents an indicated direction. The indicated direction may include the pointing direction of a body part when the user performs the action.

The object determination module 52 is configured to determine a target scene object corresponding to the indicated direction according to the action direction information and scene position information which represents positions of respective scene objects in a VR scene where the user is located.

The speech recognition module 53 is configured to identify a speech of the user as a speech of the user to the target scene object. The speech recognition module 53 may translate the spoken language in the speech into text and then transmit the text to the target user correspond to the target scene object.

In an example, the direction recognition module 51 is configured to obtain the indicated direction of the speech of the user according to an angle of an eyeball of the user during the speech.

In an example, the operation that the direction recognition module 51 obtains the indicated direction of the speech of the user according to the angle of the eyeball of the user during the speech includes: when a proportion of a time period for which the angle of the eyeball of the user is fixed during the speech to a total time period of the speech reaches a preset proportion threshold value, a direction of a line of sight corresponding to the angle of the eyeball is determined as the indicated direction of the speech of the user. For example, the preset proportion threshold value may be a value that is set between 50% and 100%. The VR equipment may set the initial value of the preset proportion threshold value to be 50% and then adjusts the preset proportion threshold value based on collected user data.

In an example, the direction recognition module 51 is configured to obtain the indicated direction of the speech of the user according to a hand motion of the user during the speech.

In an example, the operation that the direction recognition module 51 obtains the indicated direction of the speech of the user according to the hand motion of the user during the speech includes: when a motion distance of the hand motion of the user during the speech reaches a preset distance threshold value, a direction of the hand motion is determined as the indicated direction of the speech of the user. The preset distance may be between 5.0 cm and 200 cm, preferably between 10.0 cm and 100.0 cm.

In an example, the object determination module 52 is configured to, when the indicated direction of the speech is within a preset range of direction, determine a scene object located within the range of direction as the target scene object according to the scene position information. The preset range of direction may be between −30 degree and +30 degree, or more preferably between −20 degree and +20 degree. Here, the preset range of direction may be adjusted by the user of the device.

Figure 6:
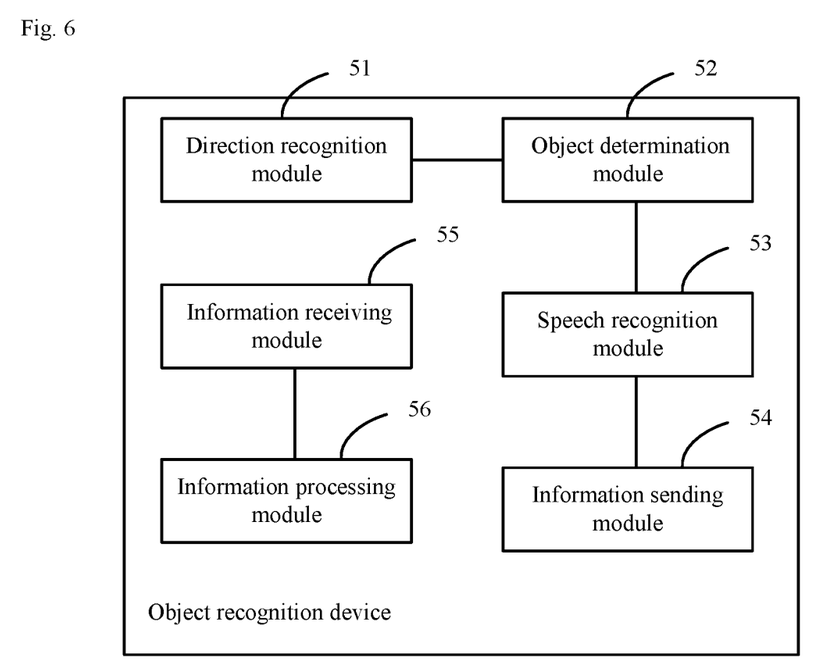
FIG. 6 is a diagram showing structure of another device for identifying an object in VR communication, according to an exemplary embodiment.

FIG. 6 is a diagram of structure of another device for identifying an object in VR communication, according to an exemplary embodiment. As shown in FIG. 6, the device may further include an information sending module 54, configured to send the speech of the user to VR equipment corresponding to the target scene object. The information sending module 54 may include a transmitter or other communication hardware.

In an example, the device may further include an information receiving module 55 and information processing module 56.

The information receiving module 55 is configured to receive information on the speech of the user. The information on the speech of the user includes content of the speech and an object ID of a speaker corresponding to the content of the speech. The information receiving module 55 may include a receiver or other communication hardware.

The information processing module 56 is configured to play the content of the speech through a scene object corresponding to the speaker in the VR scene according to the object ID.

Figure 7:
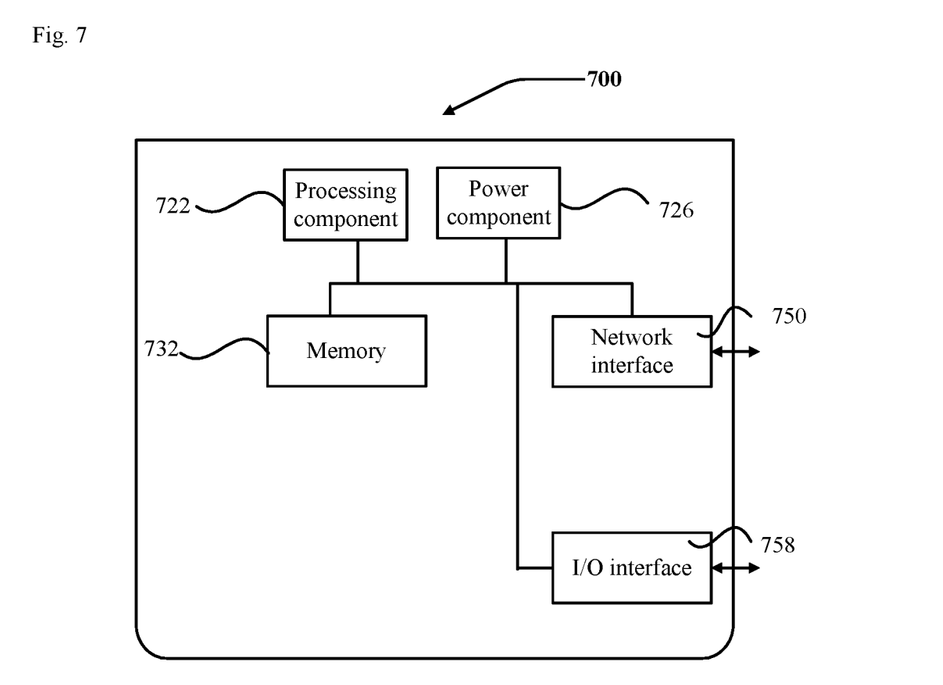
FIG. 7 is a block diagram showing VR equipment, according to an exemplary embodiment.

FIG. 7 is a block diagram of VR equipment 700, according to an exemplary embodiment. For example, referring to FIG. 7, the device 700 includes a processing component 722, which further includes one or more processors, and a memory resource represented by a memory 732, configured to store instructions executable by the processing component 722, such as an application program. The application program stored in the memory 732 may include one or more modules, and each module corresponds to a set of instructions. In addition, the processing component 722 is configured to execute the instructions to perform the abovementioned method in which action direction information of an action performed by a user is acquired, wherein the action direction information represents an indicated direction; a target scene object corresponding to the indicated direction is determined according to the action direction information and scene position information which represents positions of respective scene objects in a VR scene where the user is located; and a speech of the user is identified as a speech of the user to the target scene object.

The device 700 may further include a power component 726 configured to perform power management of the device 700, a wired or wireless network interface 750 configured to connect the device 700 to a network, and an Input/Output (I/O) interface 758.

In this disclosure, the device 700 may be implemented by one or more circuitries, which include Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, micro-controllers, microprocessors or other electronic components. The device 700 may use the circuitries in combination with the other hardware or software components for performing the above described methods. Each module, sub-module, unit, or sub-unit in the disclosure may be implemented at least partially using the one or more circuitries.

In addition, in an exemplary embodiment of the present disclosure, there is also provided a non-transitory computer-readable storage medium containing instructions, for example, a memory containing instructions that may be executed by the processor of the device to implement the abovementioned method, for example, including: action direction information of an action performed by a user is acquired, wherein the action direction information represents an indicated direction; a target scene object corresponding to the indicated direction is determined according to the action direction information and scene position information which represents positions of respective scene objects in a VR scene where the user is located; and a speech of the user is identified as a speech of the user to the target scene object. For example, the non-transitory computer-readable storage medium may be a Read-Only Memory (ROM), a Compact Disc Read-Only Memory (CD-ROM), a magnetic tape, a floppy disc, optical data storage equipment and the like.

The terminology used in the present disclosure is for the purpose of describing exemplary embodiments only and is not intended to limit the present disclosure. As used in the present disclosure and the appended claims, the singular forms "a," "an" and "the" are intended to include the plural forms as well, unless the context clearly indicates otherwise. It shall also be understood that the terms "or" and "and/or" used herein are intended to signify and include any or all possible combinations of one or more of the associated listed items, unless the context clearly indicates otherwise.

It shall be understood that, although the terms "first," "second," "third," etc. may be used herein to describe various information, the information should not be limited by these terms. These terms are only used to distinguish one category of information from another. For example, without departing from the scope of the present disclosure, first information may be termed as second information; and similarly, second information may also be termed as first information. As used herein, the term "if" may be understood to mean "when" or "upon" or "in response to" depending on the context.

Reference throughout this specification to "one embodiment," "an embodiment," "exemplary embodiment," or the like in the singular or plural means that one or more particular features, structures, or characteristics described in connection with an embodiment is included in at least one embodiment of the present disclosure. Thus, the appearances of the phrases "in one embodiment" or "in an embodiment," "in an exemplary embodiment," or the like in the singular or plural in various places throughout this specification are not necessarily all referring to the same embodiment. Furthermore, the particular features, structures, or characteristics in one or more embodiments may be combined in any suitable manner.

Other embodiments of the present disclosure will be easily conceived by those skilled in the art from consideration of the specification and practice of the present disclosure. This application is intended to cover any variations, uses, or adaptations of the present disclosure following the general principles of the present disclosure and including such departures from the embodiments of the present disclosure as come within common knowledge or conventional technical means in the art. It is intended that the specification and examples be considered as exemplary only, and a true scope and spirit of the present disclosure are defined by the following claims.

It will be appreciated that the present disclosure is not limited to the exact construction that has been described above and illustrated in the accompanying drawings, and that various modifications and changes may be made without departing from the scope thereof. It is intended that the scope of the present disclosure only be defined by the appended claims.

What is claimed is:

1. A method, comprising:
   acquiring, by a Virtual Reality (VR) device, action direction information of an action performed by a user, wherein the action direction information represents an indicated direction;
   determining, by the VR device, a target scene object corresponding to the indicated direction according to the action direction information and scene position information, wherein the scene position information represents positions of respective scene objects in a VR scene generated by the VR device, wherein the user is located in the VR scene; and
   identifying, by the VR device, a speech of the user as a speech of the user to the target scene object,
   wherein acquiring the action direction information of the action performed by the user comprises:
   obtaining the indicated direction of the speech of the user according to an angle of an eyeball of the user during the speech,
   wherein obtaining the indicated direction of the speech of the user according to the angle of the eyeball of the user during the speech comprises:
   when a proportion of a time period for which the angle of the eyeball of the user is fixed during the speech to a total time period of the speech reaches a preset proportion threshold value, determining a direction of a line of sight corresponding to the angle of the eyeball as the indicated direction of the speech of the user,
   wherein determining the target scene object corresponding to the indicated direction according to the action direction information and the scene position information comprises:
   when the target scene object is not within the indicated direction of the speech, setting the indicated direction of the speech as a preset range of direction from the line of sight corresponding to the angle of the eyeball, and when there is only one scene object within the range of direction, determining a scene object located within the range of direction as the target scene object according to the scene position information.

2. The method according to claim 1, wherein acquiring the action direction information of the action performed by the user comprises:
   obtaining the indicated direction of the speech of the user according to a hand motion of the user during the speech.

3. The method according to claim 2, wherein obtaining the indicated direction of the speech of the user according to the hand motion of the user during the speech comprises:
   when a motion distance of the hand motion of the user during the speech reaches a preset distance threshold value, determining a direction of the hand motion as the indicated direction of the speech of the user.

4. The method according to claim 1, wherein the preset range of direction is between −30 degree to +30 degree.

5. The method according to claim 1, wherein determining the target scene object corresponding to the indicated direction according to the action direction information and the scene position information comprises:
   selecting the target scene object t.

6. The method according to claim 1, after identifying the speech of the user as the speech of the user to the target scene object, further comprising:
   sending the speech of the user to VR equipment corresponding to the target scene object.

7. The method according to claim 1, further comprising:
   receiving information on the speech of the user, wherein the speech information of the user comprises: content of the speech and an object Identifier (ID) of a speaker corresponding to the content of the speech; and
   playing the content of the speech through a scene object corresponding to the speaker in the VR scene according to the object ID.

8. A device for identifying an object in Virtual Reality (VR) communication, comprising:

a processor; and a memory configured to store instructions executable by the processor, wherein the processor is configured to:

acquire action direction information of an action performed by a user, wherein the action direction information represents an indicated direction;

determine a target scene object corresponding to the indicated direction according to the action direction information and scene position information, wherein the scene position information represents positions of respective scene objects in a VR scene generated by the device, wherein the user is located in the VR scene; and identify a speech of the user as a speech of the user to the target scene object, wherein when acquiring the action direction information of the action performed by a user, the processor is configured to:

obtain the indicated direction of the speech of the user according to an angle of an eyeball of the user during the speech, wherein when obtaining the indicated direction of the speech of the user according to the angle of the eyeball of the user during the speech, the processor is configured to:

when a proportion of a time period for which the angle of the eyeball of the user is fixed during the speech to a total time period of the speech reaches a preset proportion threshold value, determining a direction of a line of sight corresponding to the angle of the eyeball as the indicated direction of the speech of the user, wherein when the target scene object is not within the indicated direction of the speech, setting the indicated direction of the speech as a preset range of direction from the line of sight corresponding to the angle of the eyeball, and when there is only one scene object within the range of direction, determining a scene object located within the range of direction as the target scene object according to the scene position information.

9. The device according to claim 8, wherein when acquiring action direction information of the action performed by a user, the processor is configured to:

obtain the indicated direction of the speech of the user according to a hand motion of the user during the speech.

10. The device according to claim 9, wherein when obtaining the indicated direction of the speech of the user according to the hand motion of the user during the speech, the processor is configured to:

when a motion distance of the hand motion of the user during the speech reaches a preset distance threshold value, determining a direction of the hand motion as the indicated direction of the speech of the user.

11. The device according to claim 8, wherein when determining the target scene object corresponding to the indicated direction according to the action direction information and scene position information which represents positions of respective scene objects in a VR scene where the user is located, the processor is configured to:

when the indicated direction of the speech is within a preset range of direction, determine a scene object located within the range of direction as the target scene object according to the scene position information.

12. The device according to claim 8, wherein the processor is further configured to:

send the speech of the user to VR equipment corresponding to the target scene object.

13. The device according to claim 8, wherein the processor is further configured to:

receive information on the speech of the user, the information on the speech of the user comprising: content of the speech and an object Identifier (ID) of a speaker corresponding to the content of the speech; and play the content of the speech through a scene object corresponding to the speaker in the VR scene according to the object ID.

14. A non-transitory computer-readable storage medium having stored therein instructions that, when executed by a processor of device for identifying an object in Virtual Reality (VR) communication, causes the device to perform a method for identifying an object in Virtual Reality (VR) communication, the method comprising:

acquiring action direction information of an action performed by a user, which represents an indicated direction;

determining a target scene object corresponding to the indicated direction according to the action direction information and scene position information which represents positions of respective scene objects in a VR scene where the user is located; and identifying a speech of the user as a speech of the user to the target scene object, wherein acquiring the action direction information of the action performed by the user comprises:

obtaining the indicated direction of the speech of the user according to an angle of an eyeball of the user during the speech, wherein the angle of the eyeball is situated between the indicated direction and a pointing direction of a body part when the user performs the action, wherein determining the target scene object corresponding to the indicated direction according to the action direction information and the scene position information comprises:

when the target scene object is not within the indicated direction of the speech, setting the indicated direction of the speech as a preset range of direction from the line of sight corresponding to the angle of the eyeball, and when there is only one scene object within the range of direction, determining a scene object located within the range of direction as the target scene object according to the scene position information.

* * * * *